(12) United States Patent
Yoneyama

(10) Patent No.: US 6,822,807 B2
(45) Date of Patent: Nov. 23, 2004

(54) ZOOM LENS SYSTEM

(75) Inventor: Shuji Yoneyama, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/610,551

(22) Filed: Jul. 2, 2003

(65) Prior Publication Data

US 2004/0017614 A1 Jan. 29, 2004

(30) Foreign Application Priority Data

Jul. 4, 2002 (JP) ........................................ 2002-196127

(51) Int. Cl.$^7$ ............................................ G02B 15/14
(52) U.S. Cl. ........................................ 359/687; 359/683
(58) Field of Search ................................ 359/687, 683

(56) References Cited

U.S. PATENT DOCUMENTS

| | | | | |
|---|---|---|---|---|
| 5,859,729 A | * | 1/1999 | Misaka | 359/686 |
| 6,052,235 A | | 4/2000 | Ozaki | 359/686 |
| 6,078,435 A | | 6/2000 | Yoneyama | 359/691 |
| 6,128,140 A | | 10/2000 | Yoneyama | 359/687 |
| 6,353,505 B1 | | 3/2002 | Yoneyama | 359/687 |
| 6,437,923 B1 | * | 8/2002 | Yamada | 359/687 |
| 6,487,023 B2 | | 11/2002 | Yoneyama | 359/687 |

FOREIGN PATENT DOCUMENTS

| | | |
|---|---|---|
| JP | 11160619 | 6/1999 |
| JP | 2001-208971 | 8/2001 |

* cited by examiner

*Primary Examiner*—Georgia Epps
*Assistant Examiner*—William Choi
(74) *Attorney, Agent, or Firm*—Greenblum & Bernstein, P.L.C.

(57) ABSTRACT

A zoom lens system includes a positive first lens group, a negative second lens group, a positive third lens group and a positive fourth lens group. Upon zooming, each of the first through fourth lens groups independently move along the optical axis. The positive first lens group includes a negative first lens element and a positive second lens element, in this order from the object. The zoom lens system satisfies the following conditions:

$$n_{1\text{-}2} > 1.68 \quad (1)$$

$$1.35 < \Delta X1/f < 1.50 \quad (2)$$

wherein $n_{1\text{-}2}$ designates the refractive index of the positive lens element of the positive first lens group;

$\Delta X1$ designates the traveling distance of the positive first lens group from the short focal length extremity to the long focal length extremity; and f designates the focal length of the entire zoom lens system at the short focal length extremity.

5 Claims, 21 Drawing Sheets

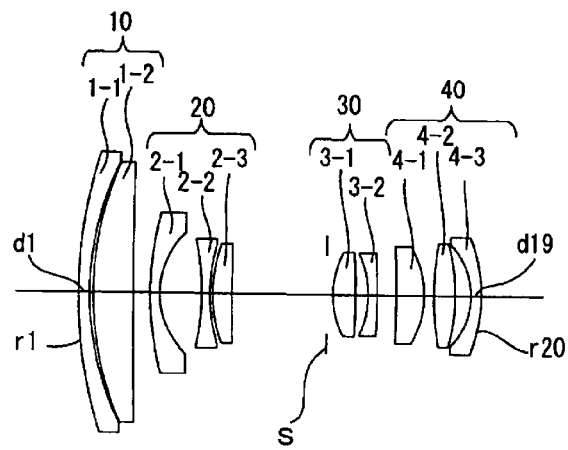
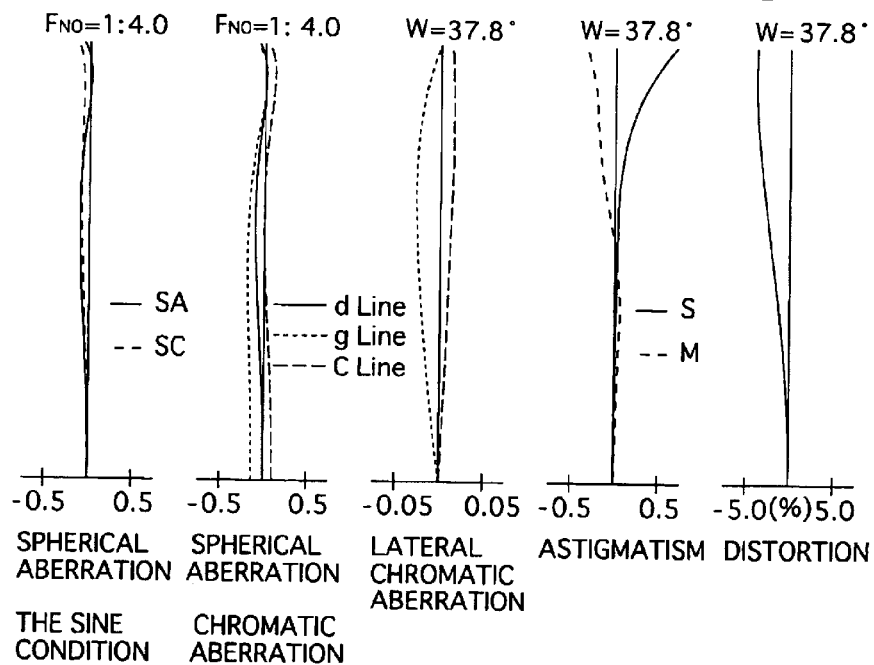

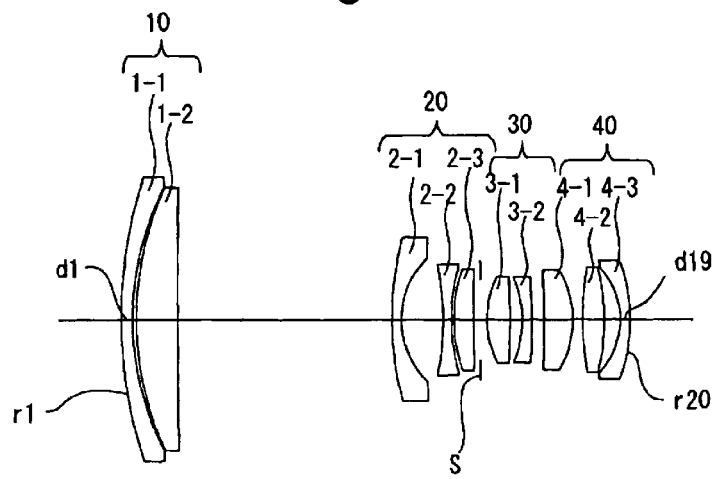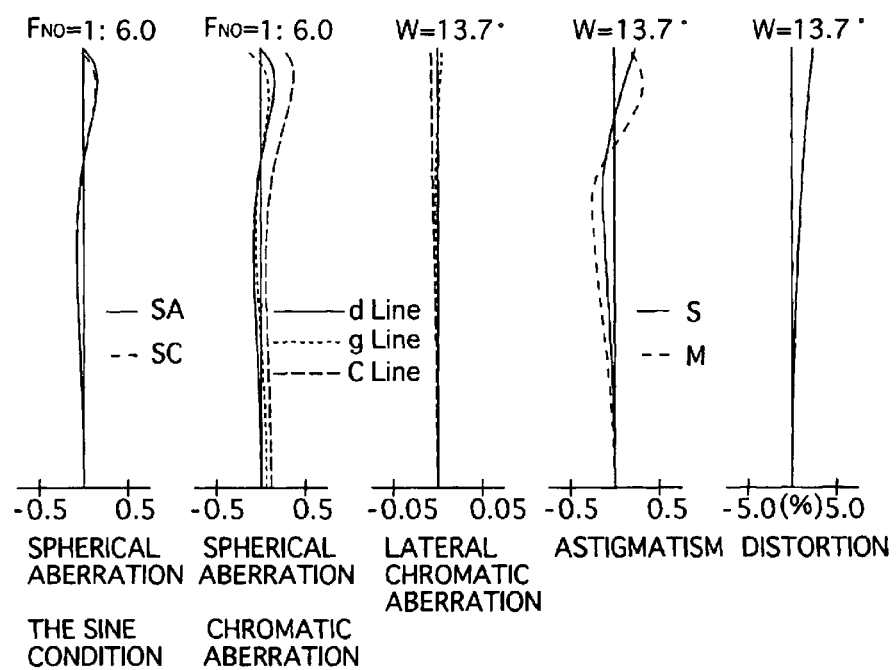

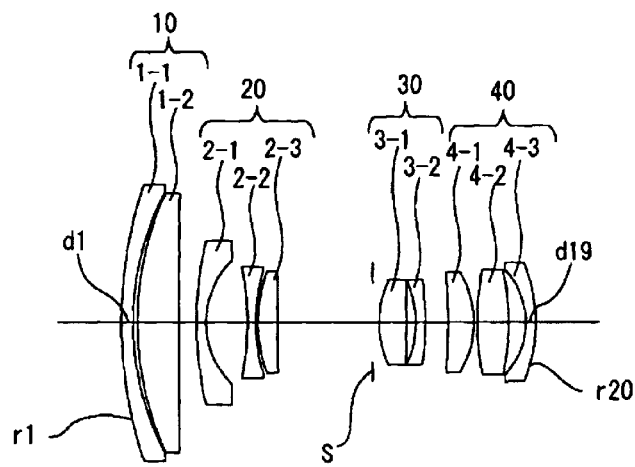
Fig. 13
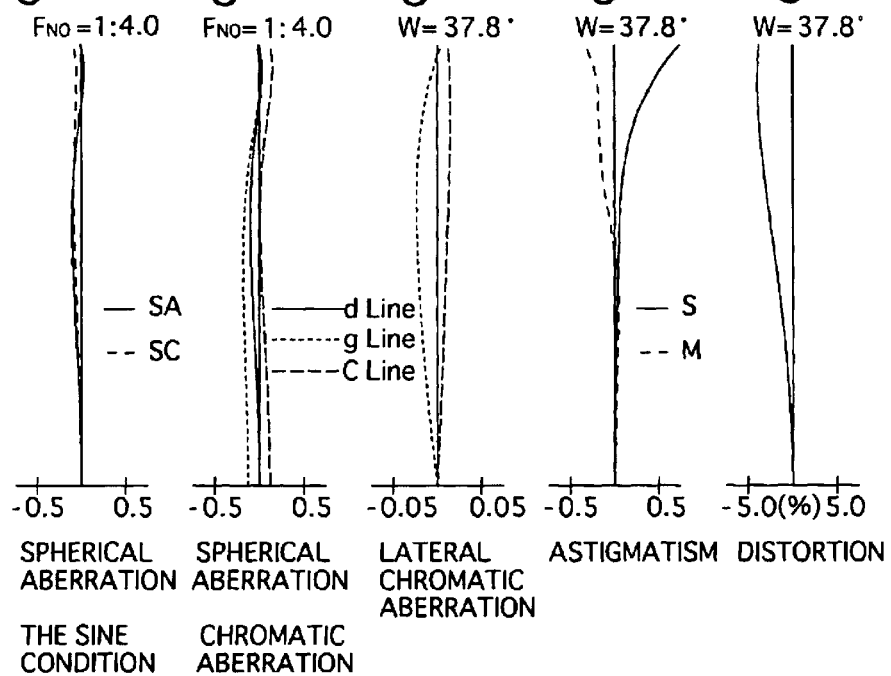

Fig. 29
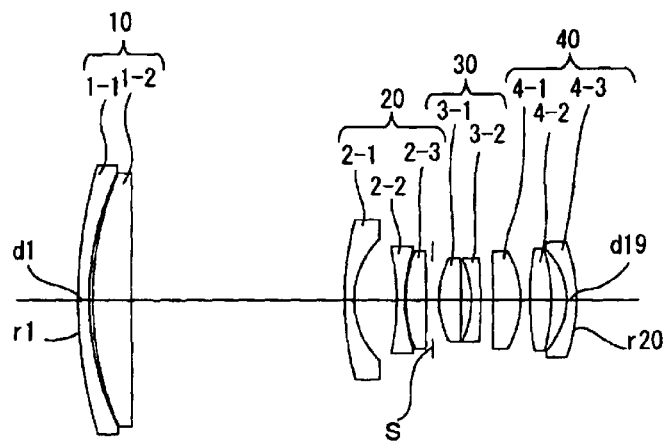
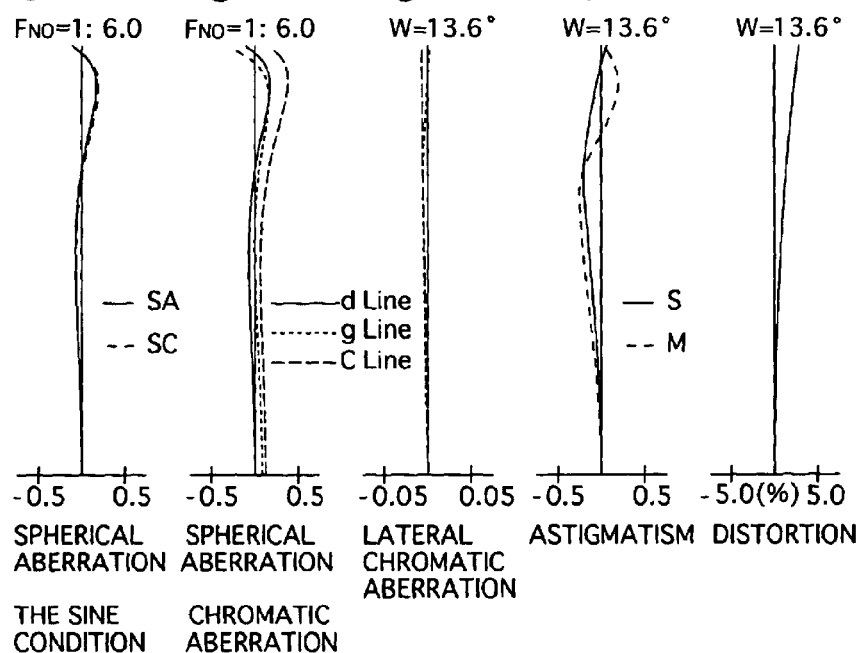
Fig.30A Fig.30B Fig.30C Fig.30D Fig.30E

Fig. 31
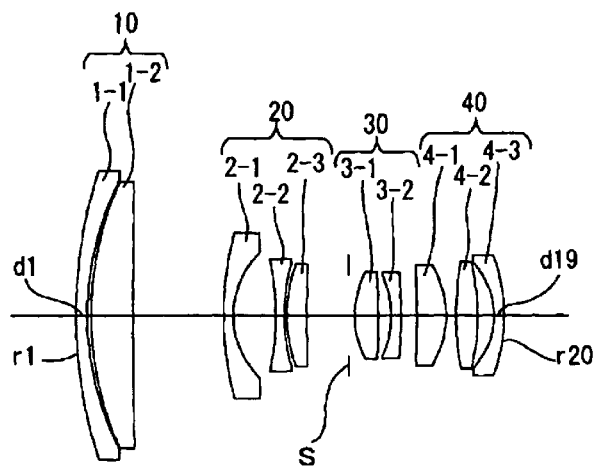
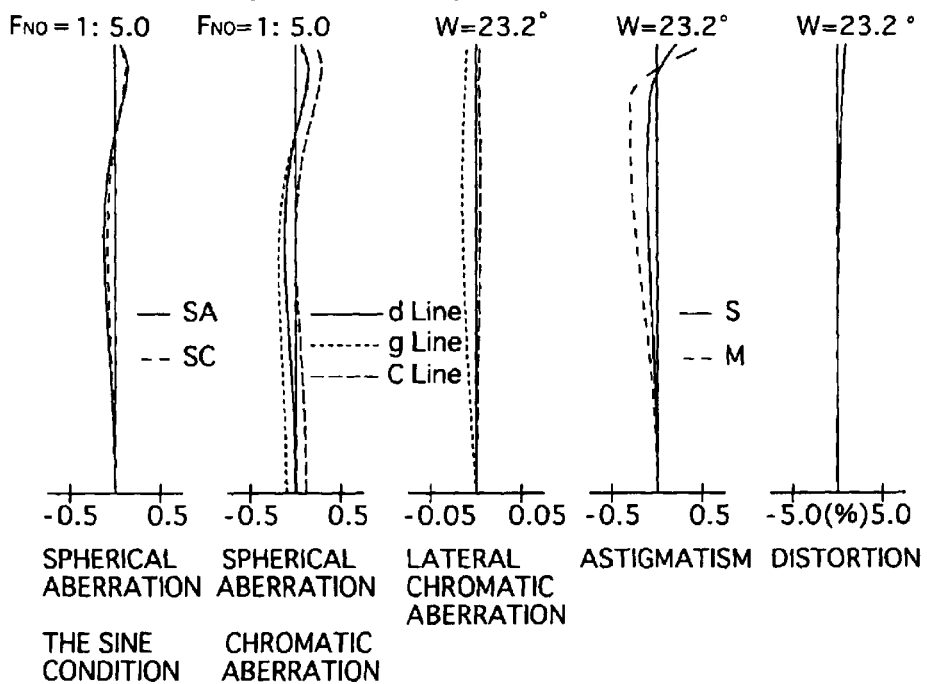

ZOOM LENS SYSTEM

BACKGROUND OF THE INVENTION

1. Field of the Invention

The present invention relates to a zoom lens system.

2. Description of the Prior Art

In a zoom lens system for normal use in a camera, cost reduction on a lens system, having the angle-of-view of about 37° at the short focal length extremity (the wide angle side), and having a zoom ratio of about 2.5 to 3.5, is required. For example, the zoom lens system, which is proposed by the applicant of the present invention in U.S. Pat. No. 6,078,435, has the zoom ratio of about 2.7; and in such a zoom lens system, a larger zoom ratio and further miniaturization are required without causing an increase of the production costs thereof. Furthermore, the applicant (inventor) has proposed the zoom lens system having the zoom ratio of about 3.5 in U.S. Pat. No. 6,487,023; however, a zoom lens system, such as one disclosed therein, is further required to reduce the production costs.

SUMMARY OF THE INVENTION

The present invention provides a zoom lens system of a four-lens-group arrangement which (i) has a large zoom ratio of about 3, (ii) is miniaturized, and (iii) is produced at relatively low costs.

According to an aspect of the present invention, there is provided a zoom lens system including a first lens group having a positive optical power (hereinafter, a positive first lens group), a second lens group having a negative optical power (hereinafter, a negative second lens group), a third lens group having a positive optical power (hereinafter, a positive third lens group) and a fourth lens group having a positive optical power (hereinafter, a positive fourth lens group), in this order from the object. Upon zooming, each of the first through fourth lens groups independently move along the optical axis.

The positive first lens group includes a negative lens element and a positive lens element, in this order from the object.

The zoom lens system satisfies the following conditions:

$$n_{1-2} > 1.68 \quad (1)$$

$$1.35 < \Delta X1/f < 1.50 \quad (2)$$

wherein $n_{1-2}$ designates the refractive index of the positive lens element of the positive first lens group;

$\Delta X1$ designates the traveling distance of the positive first lens group from the short focal length extremity to the long focal length extremity; and f designates the focal length of the entire zoom lens system at the short focal length extremity.

The zoom lens system of the present invention preferably employs an inner-focus type focusing mechanism in which focusing from infinity to an object at a closer distance is performed by moving the negative second lens group toward the object.

In the zoom lens system of the present invention, the ratio of the traveling distance of the positive first lens group to the traveling distance of the negative second lens group upon zooming is always constant, and the zoom lens system preferably satisfies the following condition:

$$3.50 < \Delta X1/\Delta X2 < 6.00 \quad (3)$$

wherein $\Delta X2$ designates the traveling distance of the negative second lens group from the short focal length extremity to the long focal length extremity.

In the zoom lens system of the present invention, the ratio of the traveling distance of the positive third lens group to the traveling distance of the positive fourth lens group upon zooming is always constant, and the zoom lens system preferably satisfies the following condition:

$$0.92 < \Delta X3/\Delta X4 < 0.98 \quad (4)$$

wherein $\Delta X3$ designates the traveling distance of the positive third lens group from the short focal length extremity to the long focal length extremity; and $\Delta X4$ designates the traveling distance of the positive fourth lens group from the short focal length extremity to the long focal length extremity.

The negative second lens group preferably includes a negative meniscus lens element having the convex surface facing toward the object, a negative lens element and a positive lens element, in this order from the object.

The positive third lens group preferably includes a positive lens element having a convex surface on the object-side thereof, and a negative lens element having a concave surface on the object-side thereof, in this order from the object.

The positive fourth lens group preferably includes a positive lens element having a convex surface on the image-side thereof, a positive lens element and a negative meniscus lens element having the concave surface facing toward the object, in this order from the object.

The present disclosure relates to subject matter contained in Japanese Patent Application No. 2002-196127 (filed on Jul. 4, 2002) which is expressly incorporated herein in its entirety.

BRIEF DESCRIPTION OF THE DRAWINGS

The present invention will be discussed below in detail with reference to the accompanying drawings, in which:

FIG. 1 is a lens arrangement, at the short focal length extremity, of the zoom lens system according to a first embodiment of the present invention;

FIGS. 2A, 2B, 2C, 2D and 2E show aberrations occurred in the lens arrangement shown in FIG. 1;

FIG. 5 is a lens arrangement, at the long focal length extremity, of the zoom lens system according to the first embodiment of the present invention;

FIGS. 6A, 6B, 6C, 6D and 6E show aberrations occurred in the lens arrangement shown in FIG. 5;

FIG. 13 is a lens arrangement, at the short focal length extremity, of the zoom lens system according to a third embodiment of the present invention;

FIGS. 14A, 14B, 14C, 14D and 14E show aberrations occurred in the lens arrangement shown in FIG. 13;

FIGS. 24A, 24, 24C, 24D and 24E show aberrations occurred in the lens arrangement shown in FIG. 23;

FIG. 29 is a lens arrangement, at the long focal length extremity, of the zoom lens system according to the fifth embodiment of the present invention;

FIGS. 30A, 30B, 30C, 30D and 30E show aberrations occurred in the lens arrangement shown in FIG. 29;

FIG. 31 is a lens arrangement, at an intermediate focal length, of the zoom lens system according to a sixth embodiment of the present invention;

FIGS. 32A, 32B, 32C, 32D and 32E show aberrations occurred in the lens arrangement shown in FIG. 31;

DESCRIPTION OF THE PREFERRED EMBODIMENTS

Figure 3:
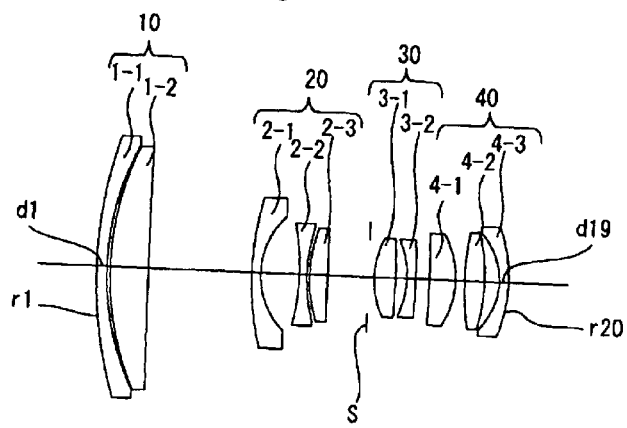
FIG. 3 is a lens arrangement, at an intermediate focal length, of the zoom lens system according to the first embodiment of the present invention.
Figures 4A, 4B, 4C, 4D, 4E:
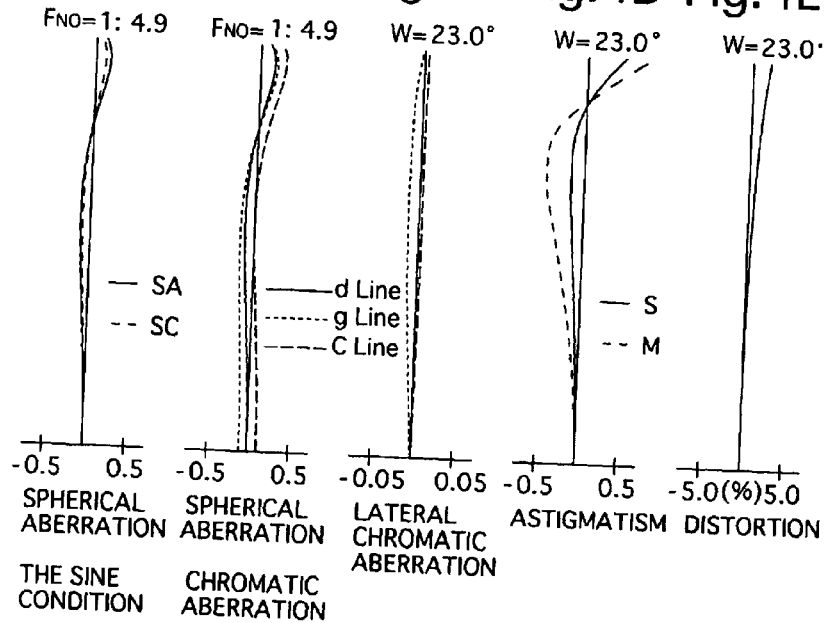
FIGS. 4A, 4B, 4C, 4D and 4E show aberrations occurred in the lens arrangement shown in FIG. 3.

The zoom lens system of the present invention, as shown in the lens-group moving paths of FIGS. 35 through 41, includes a positive first lens group 10, a negative second lens group 20, a positive third lens group 30, and a positive fourth lens group 40, in this order from the object. Each of the positive first through positive fourth lens groups move along the optical axis direction upon zooming. More specifically, upon zooming from the short focal length extremity to the long focal length extremity, the positive first lens group 10, the negative second lens group 20, the positive third lens group 30 and the positive fourth lens group 40 each move toward the object. A diaphragm S is provided in front of the positive third lens group 30 and moves together with the positive third lens group 30.

As shown in the lens arrangement of each embodiment, the positive first lens group 10 includes a negative lens element 1-1 and a positive lens element 1-2; the negative second lens group 20 includes a negative meniscus lens element 2-1 having the convex surface facing toward the object, a negative lens element 2-2 and a positive lens element 2-3; the positive third lens group 30 includes a positive lens element 3-1 having a convex surface on the object-side thereof, and a negative lens element 3-2 having a concave surface on the object-side thereof; and the positive fourth lens group 40 includes a positive lens element 4-1 having a convex surface on the image-side thereof, a positive lens element 4-2, and a negative meniscus lens element 4-3 having the concave surface facing toward the object, in this order from the object.

In the present invention, since the positive first lens group 10 is constituted by the two lens elements, i.e., a negative lens element 1-1 and a positive lens element 1-2, the overall cost can be reduced.

Condition (1) is for preventing occurrence of coma and spherical aberration especially at the long focal length extremity (telephoto side). By providing refractive index of 1.68 or more (preferably, 1.75 or more) in the positive lens element 1-2, occurrence of coma and spherical aberration especially at the telephoto side can be prevented.

Condition (2) specifies the traveling distance of the positive first lens group 10. By increasing the traveling distance of the positive first lens group 10 so that condition (2) is satisfied, occurrence of aberrations can be reduced by making the power of the negative second lens group 20 and thereafter weaker, while the zoom ratio of the negative second lens group 20 and thereafter is maintained. Furthermore, the power of the positive first lens group 10 can be made weaker, so that occurrence of aberrations can be reduced.

In the embodiments, focusing from infinity to an object at a closer distance is carried out by moving the negative second lens group 20 toward the object.

On the other hand, if an attempt is made to carry out focusing by the positive first lens group 10, aberrations occurred in the positive first lens group 10 have to be reduced in order to reduce the change in aberrations at closer distances. Accordingly, it becomes difficult to constitute the positive first lens group 10 by a smaller number of lens element, e.g., two lens elements. Moreover, since the positive first lens group 10 has a large lens diameter to prevent insufficient peripheral illumination, if the number of lens elements is increased for the purpose of the correcting of aberrations, the weight and cost thereof largely increase. It is therefore advantageous to carry out focusing with the negative second lens group 20.

In the case where each of the positive first lens group 10 through positive fourth lens group 40 is arranged to move by a constant moving ratio, the moving mechanism can be constituted by a simple thread mechanism without using complicated cams. Accordingly, it is possible to reduce the costs on the mechanical structure of the lens frames.

Condition (3) specifies the ratio of the traveling distance of positive first lens group 10 to the traveling distance of the negative second lens group 20 when these lens groups 10 and 20 are moved by a constant moving ratio.

If ΔX1/ΔX2 exceeds the lower limit of condition (3), the change in distance between the positive first lens group 10 and the negative second lens group 20 becomes smaller, and a desirable zoom ratio cannot be achieved. Consequently, it becomes difficult to maintain the power of the positive first lens group 10 weaker.

If ΔX1/ΔX2 exceeds the upper limit of condition (3), the traveling distance of the positive first lens group 10 together with the traveling distance thereof determined by condition (2) becomes too long, so that the lens frames of the zoom lens system cannot be constituted.

Condition (4) specifies the ratio of the traveling distance of the positive third lens group 30 to the traveling distance of the positive fourth lens group 40 when these lens groups 30 and 40 are moved by a constant moving ratio. Note that the distance between the positive third lens group 30 the positive fourth lens group 40 mainly functions to maintain field curvature constant upon zooming.

If ΔX3/ΔX4 exceeds the upper limit of condition (4) to the extent that ΔX3/ΔX4 is closer to 1, the change in the distance between the positive third lens group 30 and the positive fourth lens group 40 becomes smaller. Consequently, the effect on the correcting of field curvature cannot be obtained.

If ΔX3/ΔX4 exceeds the lower limit of condition (4), the positive third lens group 30 and the positive fourth lens 40 would physically collide, so that the distance between theses lens groups 30 and 40 at the short focal length extremity (the wide-angle side) becomes too long. Consequently, it becomes difficult to secure peripheral illumination.

Specific numerical data of the embodiments will be described hereinafter. In the diagrams of chromatic aberration and the sine condition, the solid line and the dotted line respectively designate spherical aberration (SA) and the sine condition (SC). In the diagrams of chromatic aberration (axial chromatic aberration) represented by spherical aberration, the solid line and the two types of dotted lines respectively designate spherical aberrations with respect to the d, g and C lines. Also, in the diagrams of lateral chromatic aberration, the two types of dotted lines respectively indicate magnification with respect to the g and C lines; however, the d line as the base line coincides with the ordinate. S designates the sagittal image, and M designates the meridional image. In the tables, FNO designates the f-number, f designates the focal length of the entire zoom lens system, fB designates the back focal distance (the distance from the most image-side surface of the zoom lens system to the image plane), W designates the half angle-of-view (°), r designates the radius of curvature, d designates the lens-element thickness or distance between lens elements, $N_d$ designates the refractive index of the d-line, and ν designates the Abbe number.

Embodiment 1

Figure 35:
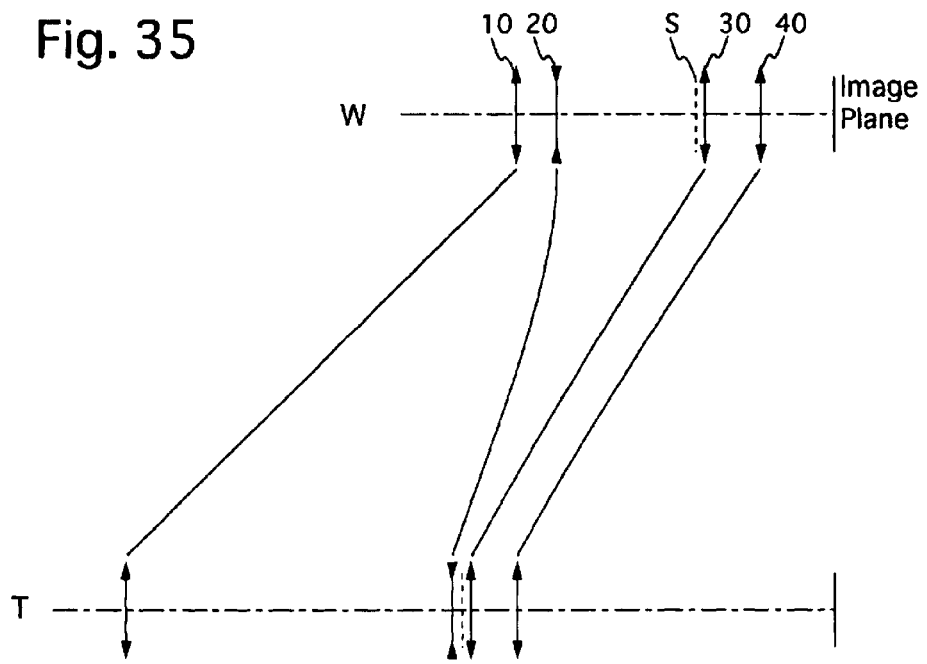
FIG. 35 is the schematic view of the lens-group moving paths for the zoom lens system according to the first embodiment of the present invention.

FIG. 1 is the lens arrangement, at the short focal length extremity, of the zoom lens system according to the first embodiment. FIGS. 2A through 2E show aberrations occurred in the lens arrangement shown in FIG. 1. FIG. 3 is the lens arrangement, at an intermediate focal length, of the zoom lens system. FIGS. 4A through 4E show aberrations occurred in the lens arrangement shown in FIG. 3. FIG. 5 is the lens arrangement, at the long focal length extremity, of the zoom lens system. FIGS. 6A through 6E show aberrations occurred in the lens arrangement shown in FIG. 5. FIG. 35 is the schematic view of the lens-group moving paths for the zoom lens system. Table 1 shows the numerical data of the first embodiment. The diaphragm S is provided 1.0 in front of surface No. 11.

In the first embodiment, since each lens group moves independently of each other, spherical aberration and field curvature especially at the intermediate focal length can be corrected in an optimally balanced manner.

TABLE 1

FNO = 1:4.0–4.9–6.0
f = 29.01–49.96–86.85
W = 37.8°–23.0°–13.7°
fB = 38.00–49.99–64.53

| Surface No. | r | d | Nd | ν |
| --- | --- | --- | --- | --- |
| 1 | 72.441 | 1.80 | 1.84666 | 23.8 |
| 2 | 46.414 | 0.57 | — | — |
| 3 | 50.556 | 6.52 | 1.77250 | 49.6 |
| 4 | 1049.512 | 2.76–17.72–33.90 | — | — |
| 5 | 49.898 | 1.50 | 1.60311 | 60.7 |
| 6 | 13.606 | 6.65 | — | — |
| 7 | −41.850 | 1.30 | 1.80400 | 46.6 |
| 8 | 29.265 | 0.43 | — | — |
| 9 | 23.708 | 3.06 | 1.78472 | 25.7 |
| 10 | 508.786 | 16.14–7.98–2.14 | — | — |
| 11 | 15.054 | 3.63 | 1.65160 | 58.5 |
| 12 | −109.302 | 1.98 | — | — |
| 13 | −15.733 | 1.50 | 1.80518 | 25.4 |
| 14 | −102.508 | 3.05–2.39–1.93 | — | — |
| 15 | −193.197 | 4.50 | 1.60717 | 40.3 |
| 16 | −15.378 | 1.54 | — | — |
| 17 | 48.844 | 3.38 | 1.48749 | 70.2 |
| 18 | −32.787 | 2.55 | — | — |
| 19 | −11.961 | 1.60 | 1.83481 | 42.7 |
| 20 | −26.336 | — | — | — |

Embodiment 2

Figure 7:
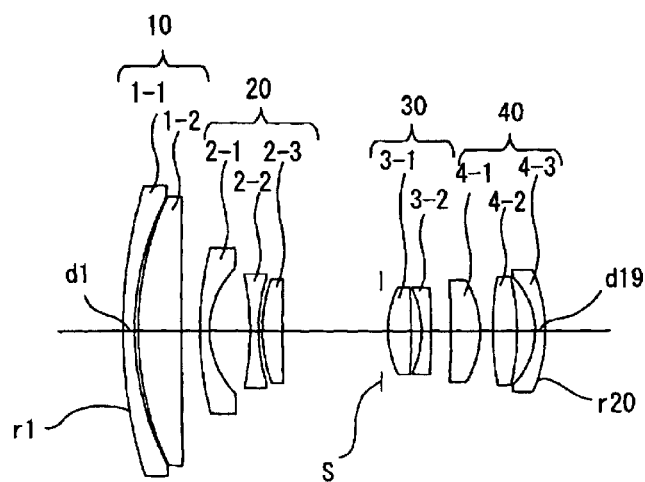
FIG. 7 is a lens arrangement, at the short focal length extremity, of the zoom lens system according to a second embodiment of the present invention.
Figures 8A, 8B, 8C, 8D, 8E:
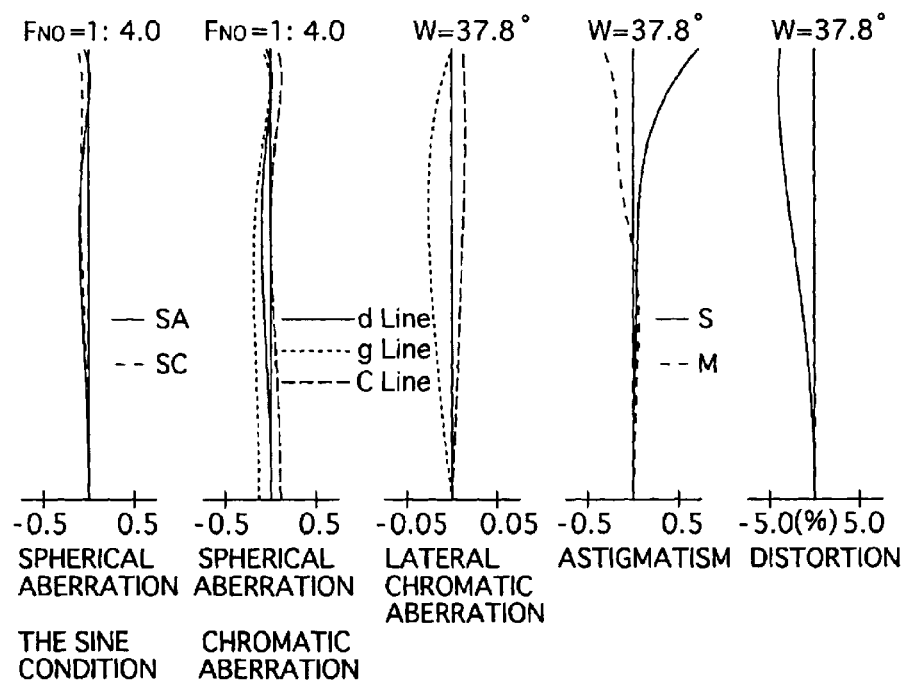
FIGS. 8A, 8B, 8C, 8D and 8E show aberrations occurred in the lens arrangement shown in FIG. 7.
Figure 9:
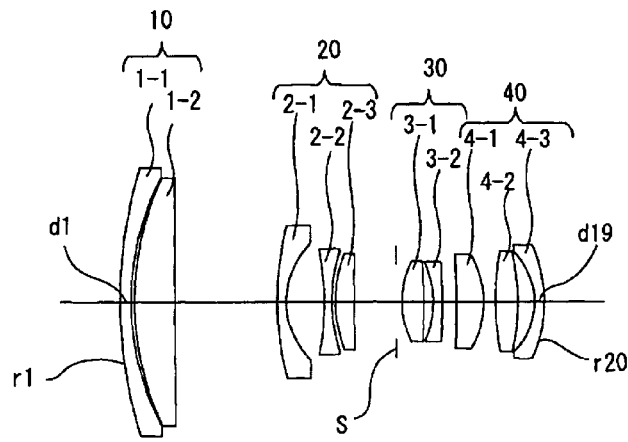
FIG. 9 is a lens arrangement, at an intermediate focal length, of the zoom lens system according to the second embodiment of the present invention.
Figures 10A, 10B, 10C, 10D, 10E:
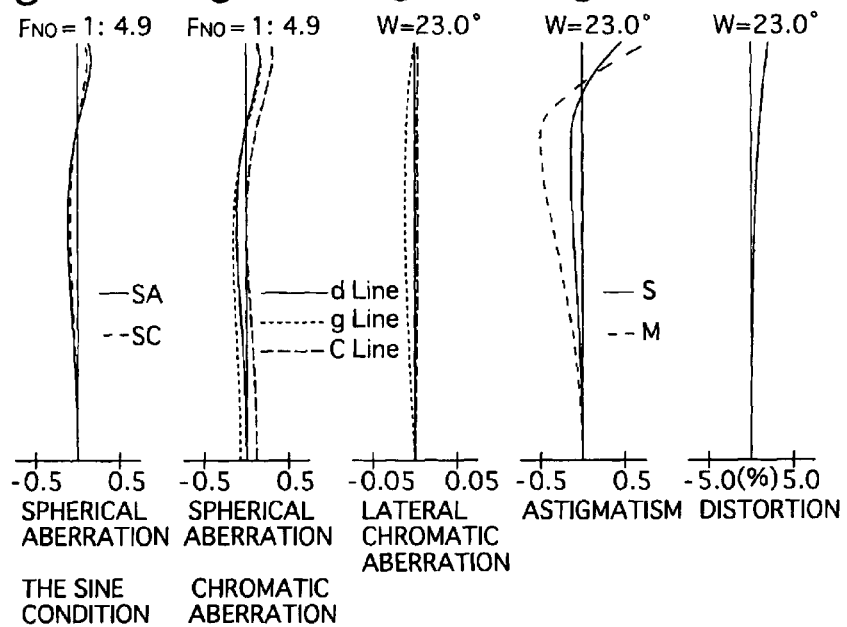
FIGS. 10A, 10B, 10C, 10D and 10E show aberrations occurred in the lens arrangement shown in FIG. 9.
Figure 11:
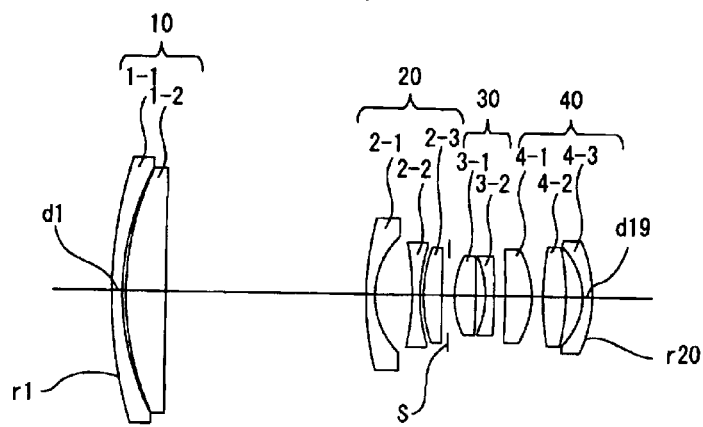
FIG. 11 is a lens arrangement, at the long focal length extremity, of the zoom lens system according to the second embodiment of the present invention.
Figures 12A, 12B, 12C, 12D, 12E:
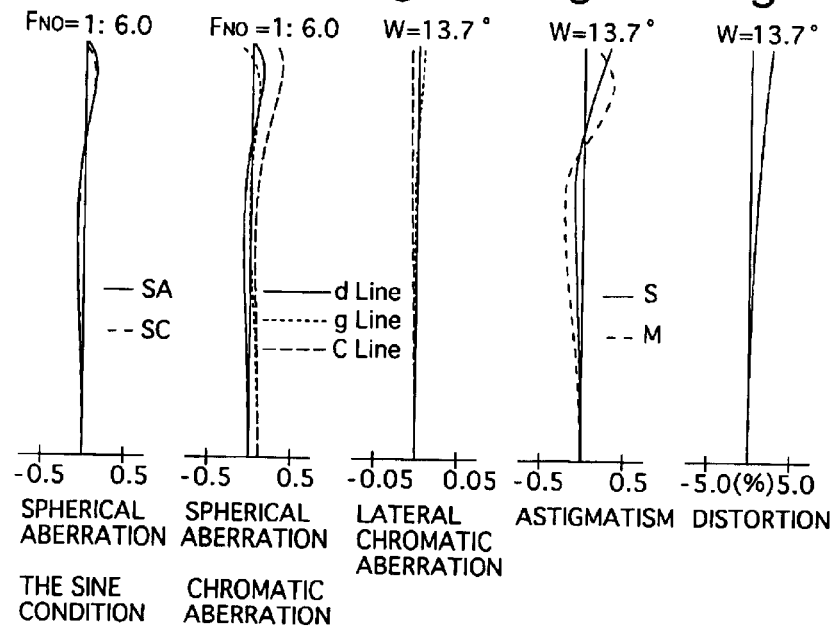
FIGS. 12A, 12B, 12C, 12D and 12E show aberrations occurred in the lens arrangement shown in FIG. 11.
Figure 36:
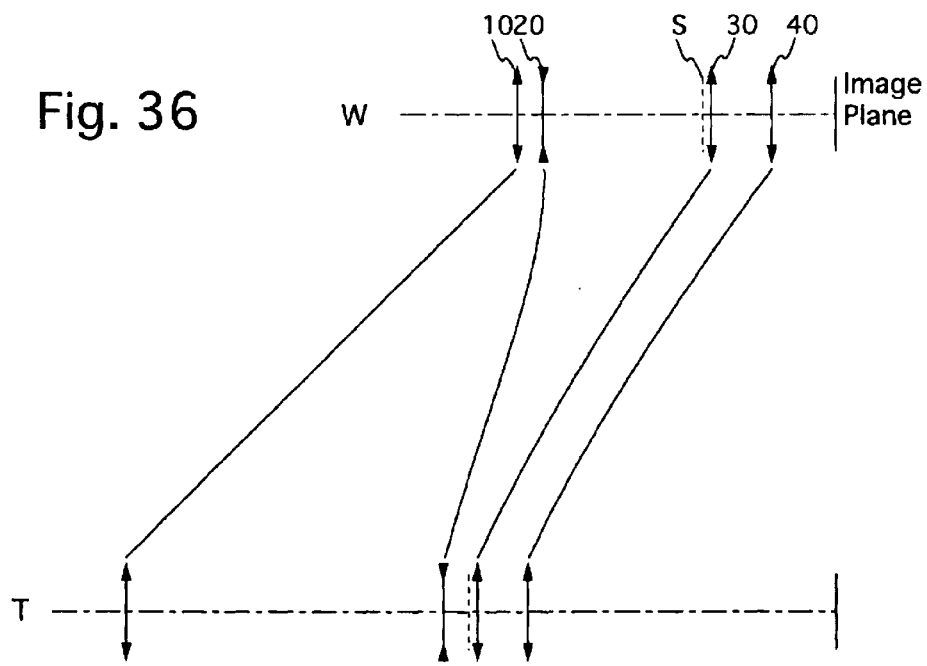
FIG. 36 is the schematic view of the lens-group moving paths for the zoom lens system according to the second embodiment of the present invention.

FIG. 7 is the lens arrangement, at the short focal length extremity, of the zoom lens system according to the second embodiment. FIGS. 8A through 8E show aberrations occurred in the lens arrangement shown in FIG. 7. FIG. 9 is the lens arrangement, at an intermediate focal length, of the zoom lens system. FIGS. 10A through 10E show aberrations occurred in the lens arrangement shown in FIG. 9. FIG. 11 is the lens arrangement, at the long focal length extremity, of the zoom lens system. FIGS. 12A through 12E show aberrations occurred in the lens arrangement shown in FIG. 11. FIG. 36 is the schematic view of the lens-group moving paths for the zoom lens system. Table 2 shows the numerical data of the second embodiment. The basic arrangement of the second embodiment is the same as that of the first embodiment.

Similar to the first embodiment, in the second embodiment, since each lens group moves independently of each other, spherical aberration and field curvature especially at the intermediate focal length can be corrected in an optimally balanced manner.

TABLE 2

FNO = 1:4.0–4.9–6.0
f = 29.01–49.97–86.85
W = 37.8°–23.0°–13.7°
fB = 38.00–50.14–63.93

| Surface No. | r | d | Nd | ν |
|---|---|---|---|---|
| 1 | 77.087 | 1.80 | 1.84666 | 23.8 |
| 2 | 45.464 | 0.57 | — | — |
| 3 | 49.393 | 6.68 | 1.80400 | 46.6 |
| 4 | 1766.866 | 2.80–17.07–33.75 | — | — |
| 5 | 50.852 | 1.50 | 1.60311 | 60.7 |
| 6 | 13.832 | 6.29 | — | — |
| 7 | −42.755 | 1.30 | 1.80400 | 46.6 |
| 8 | 28.447 | 0.58 | — | — |
| 9 | 23.737 | 3.07 | 1.78472 | 25.7 |
| 10 | 434.312 | 16.37–8.00–2.14 | — | — |
| 11 | 15.164 | 3.59 | 1.65160 | 58.5 |
| 12 | −136.567 | 1.62 | — | — |
| 13 | −15.895 | 1.50 | 1.80518 | 25.4 |
| 14 | −90.593 | 3.00–2.36–1.89 | — | — |
| 15 | −156.795 | 4.50 | 1.60342 | 38.0 |
| 16 | −15.589 | 1.93 | — | — |
| 17 | 48.033 | 3.82 | 1.48749 | 70.2 |
| 18 | −37.169 | 2.79 | — | — |
| 19 | −11.857 | 1.60 | 1.83400 | 37.2 |
| 20 | −23.680 | — | — | — |

Embodiment 3

Figure 15:
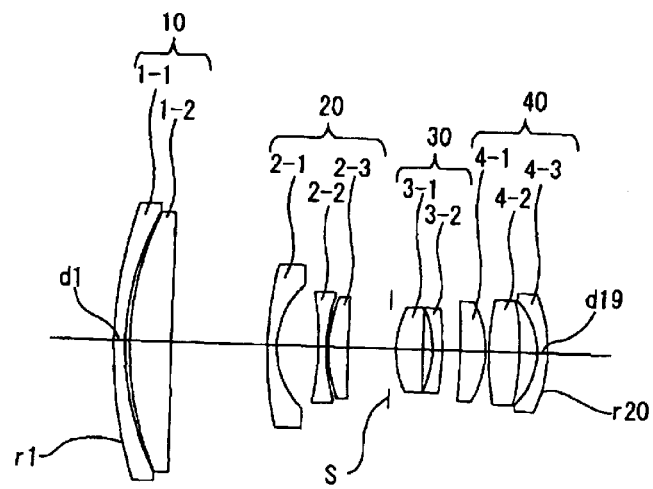
FIG. 15 is a lens arrangement, at an intermediate focal length, of the zoom lens system according to the third embodiment of the present invention.
Figures 16A, 16B, 16C, 16D, 16E:
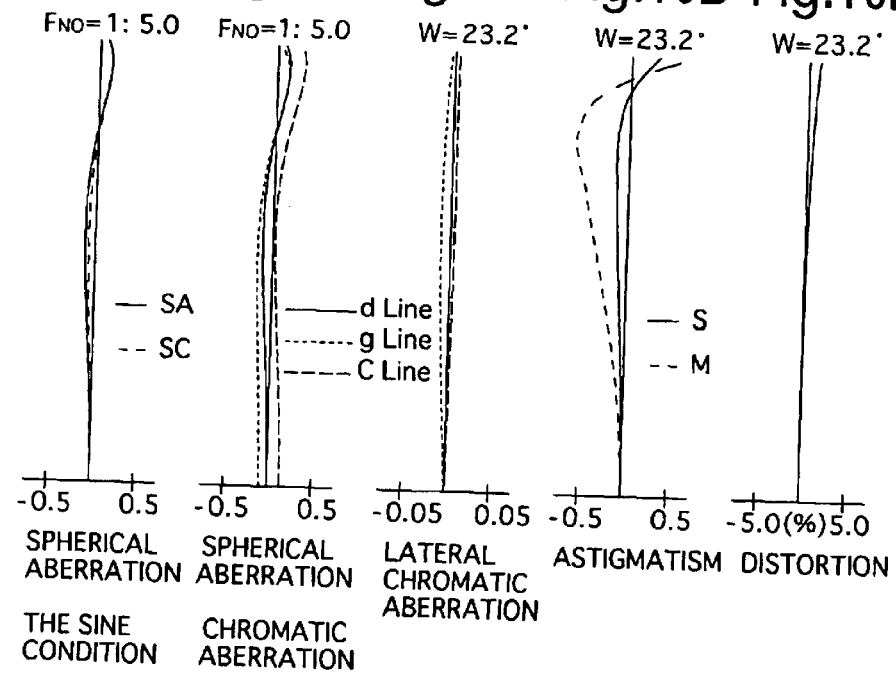
FIGS. 16A, 16B, 16C, 16D and 16E show aberrations occurred in the lens arrangement shown in FIG. 15.
Figure 17:
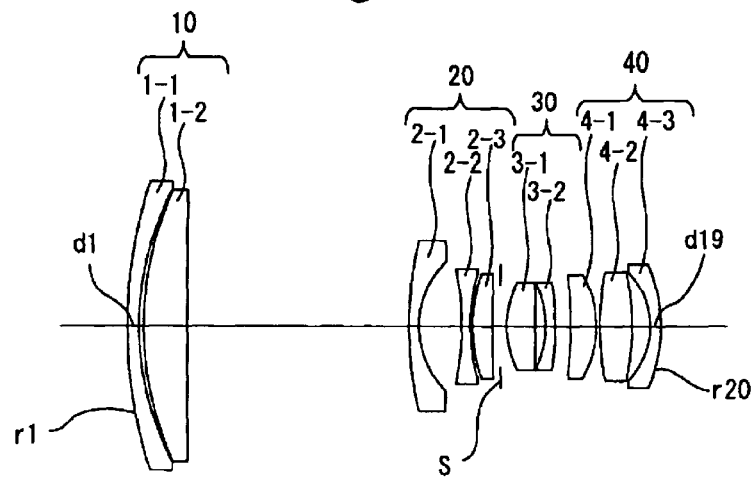
FIG. 17 is a lens arrangement, at the long focal length extremity, of the zoom lens system according to the third embodiment of the present invention.
Figures 18A, 18B, 18C, 18D, 18E:
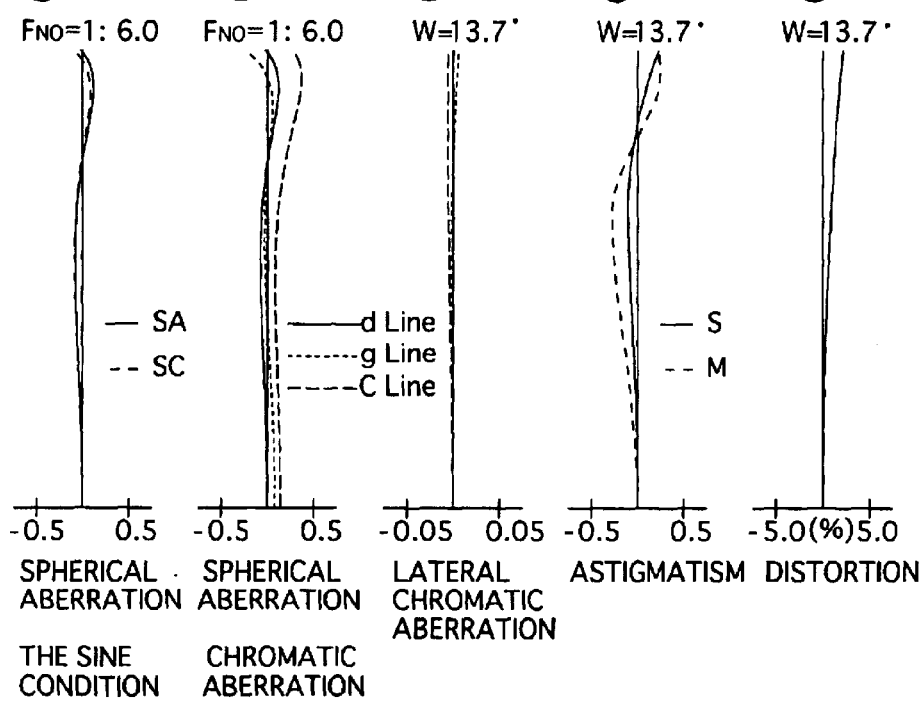
FIGS. 18A, 18B, 18C, 18D and 18E show aberrations occurred in the lens arrangement shown in FIG. 17.

FIG. 13 is the lens arrangement, at the short focal length extremity, of the zoom lens system according to the third embodiment. FIGS. 14A through 14E show aberrations occurred in the lens arrangement shown in FIG. 13. FIG. 15 is the lens arrangement, at an intermediate focal length, of the zoom lens system. FIGS. 16A through 16E show aberrations occurred in the lens arrangement shown in FIG. 15. FIG. 17 is the lens arrangement, at the long focal length extremity, of the zoom lens system. FIGS. 18A through 18E show aberrations occurred in the lens arrangement shown in FIG. 17.

Figure 37:
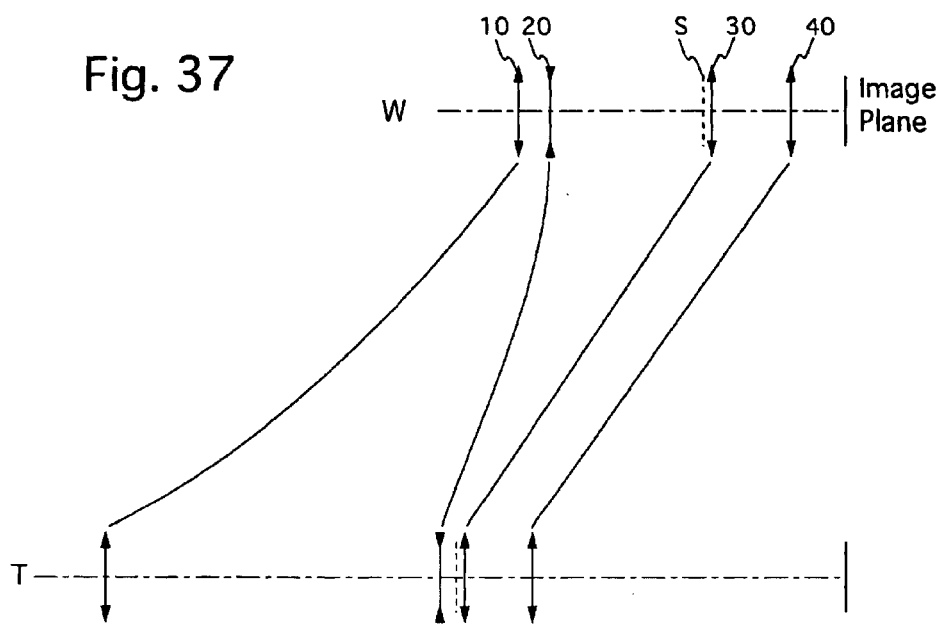
FIG. 37 is the schematic view of the lens-group moving paths for the zoom lens system according to the third embodiment of the present invention.

FIG. 37 is the schematic view of the lens-group moving paths for the zoom lens system. Table 3 shows the numerical data of the third embodiment. The basic arrangement of the third embodiment is the same as that of the first embodiment.

In the third embodiment, the positive third lens group 30 and the positive fourth lens group 40 are arranged to move upon zooming along the lens-group moving paths by a constant moving ratio so that condition (4) is satisfied. Accordingly, the moving mechanism for these lens group 30 and 40 can be constituted by a simple thread mechanism without using complicated cams, so that the overall cost of the mechanical arrangement of the lens frames can be reduced.

TABLE 3

FNO = 1:4.0–5.0–6.0
f = 29.01–49.95–86.85
W = 37.8°–23.2°–13.7°
fB = 38.00–51.14–64.08

| Surface No. | r | d | Nd | ν |
|---|---|---|---|---|
| 1 | 70.147 | 1.80 | 1.84666 | 23.8 |
| 2 | 44.666 | 0.69 | — | — |
| 3 | 49.839 | 6.55 | 1.77250 | 49.6 |
| 4 | 1771.161 | 2.75–15.20–33.56 | — | — |
| 5 | 56.372 | 1.50 | 1.60311 | 60.7 |
| 6 | 13.800 | 6.51 | — | — |
| 7 | −44.467 | 1.30 | 1.80400 | 46.6 |
| 8 | 28.278 | 0.35 | — | — |
| 9 | 23.250 | 3.06 | 1.80518 | 25.4 |
| 10 | 308.542 | 16.07–7.59–2.16 | — | — |
| 11 | 15.110 | 4.33 | 1.65160 | 58.5 |
| 12 | −420.553 | 1.50 | — | — |
| 13 | −15.707 | 1.50 | 1.84666 | 23.8 |
| 14 | −48.362 | 3.58–2.91–2.26 | — | — |
| 15 | −92.276 | 4.00 | 1.62045 | 38.1 |
| 16 | −15.700 | 0.55 | — | — |
| 17 | 43.340 | 4.91 | 1.48749 | 70.2 |
| 18 | −39.792 | 2.78 | — | — |
| 19 | −11.851 | 1.60 | 1.83400 | 37.2 |
| 20 | −24.083 | — | — | — |

Embodiment 4

Figure 19:
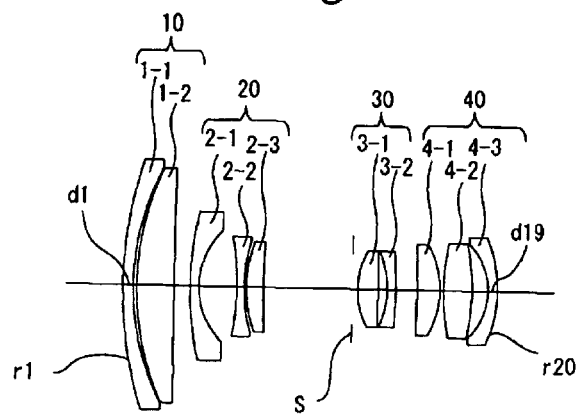
FIG. 19 is a lens arrangement, at the short focal length extremity, of the zoom lens system according to a fourth embodiment of the present invention.
Figures 20A, 20B, 20C, 20D, 20E:
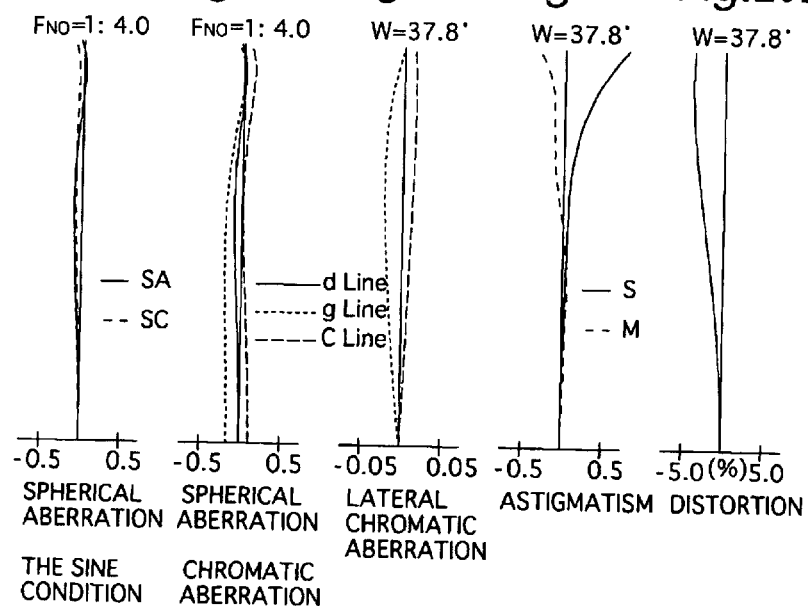
FIGS. 20A, 20B, 20C, 20D and 20E show aberrations occurred in the lens arrangement shown in FIG. 19.
Figure 21:
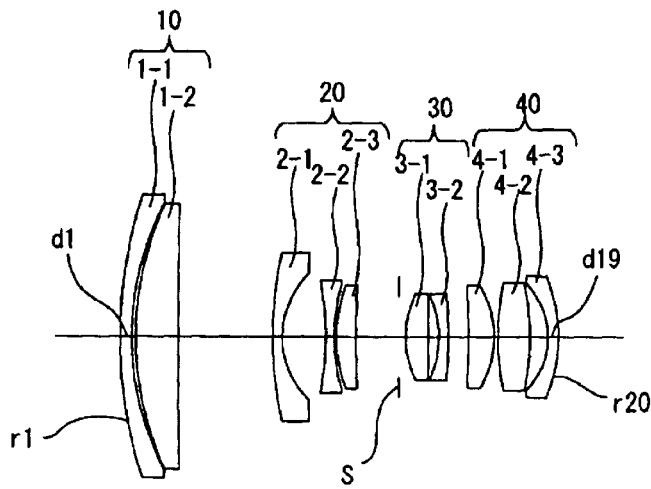
FIG. 21 is a lens arrangement, at an intermediate focal length, of the zoom lens system according to the fourth embodiment of the present invention.
Figures 22A, 22B, 22C, 22D, 22E:
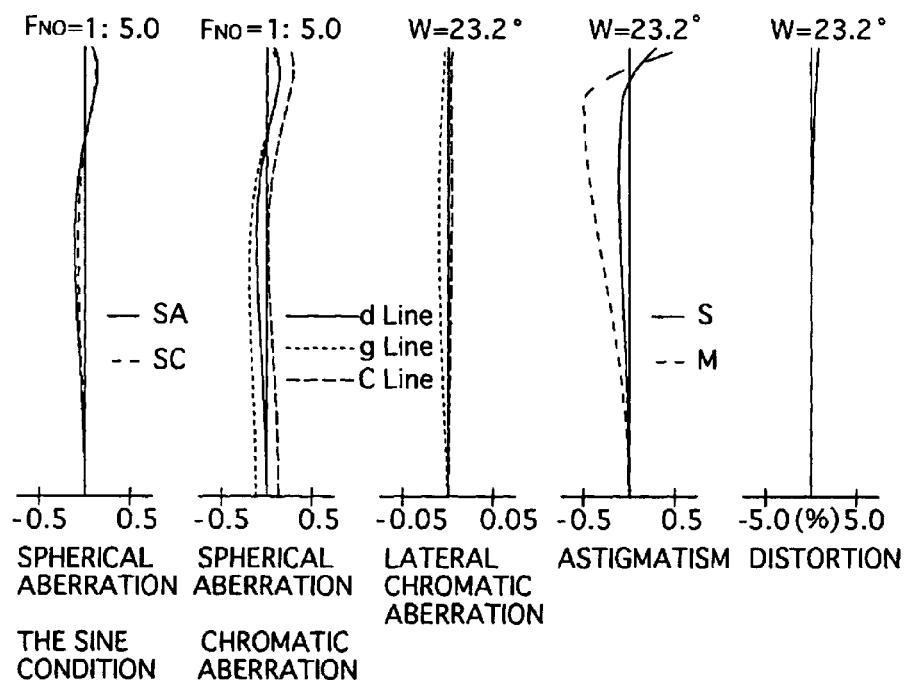
FIGS. 22A, 22B, 22C, 22D and 22E show aberrations occurred in the lens arrangement shown in FIG. 21.
Figure 23:
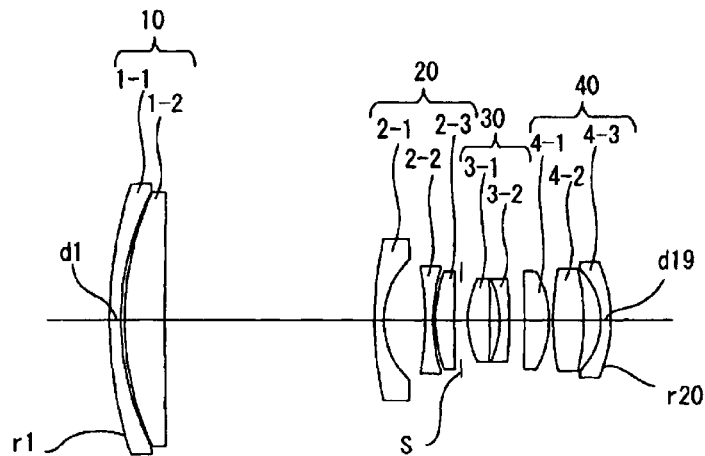
FIG. 23 is a lens arrangement, at the long focal length extremity, of the zoom lens system according to the fourth embodiment of the present invention.
Figures 24A, 24B, 24C, 24D, 24E:
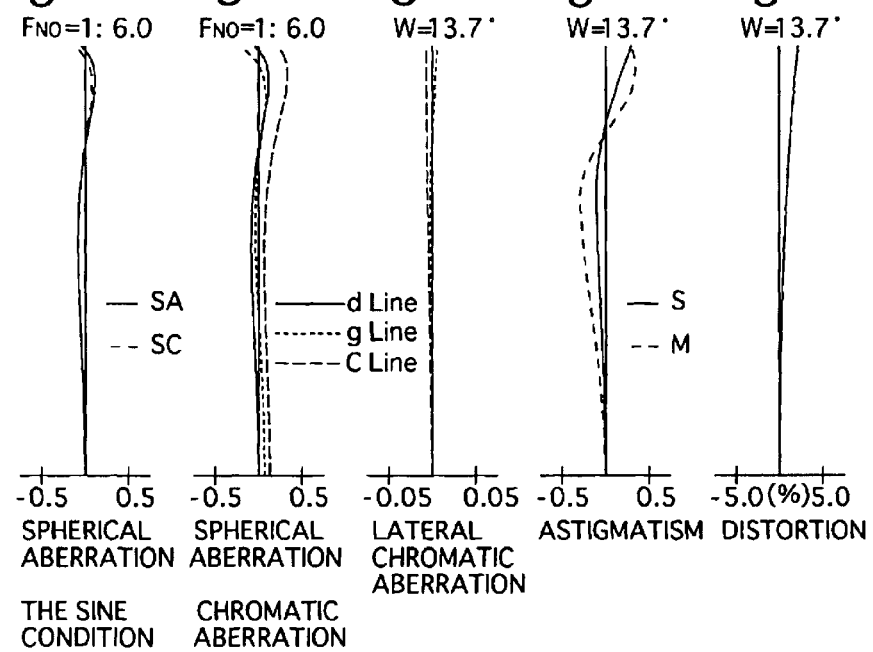
Figure 38:
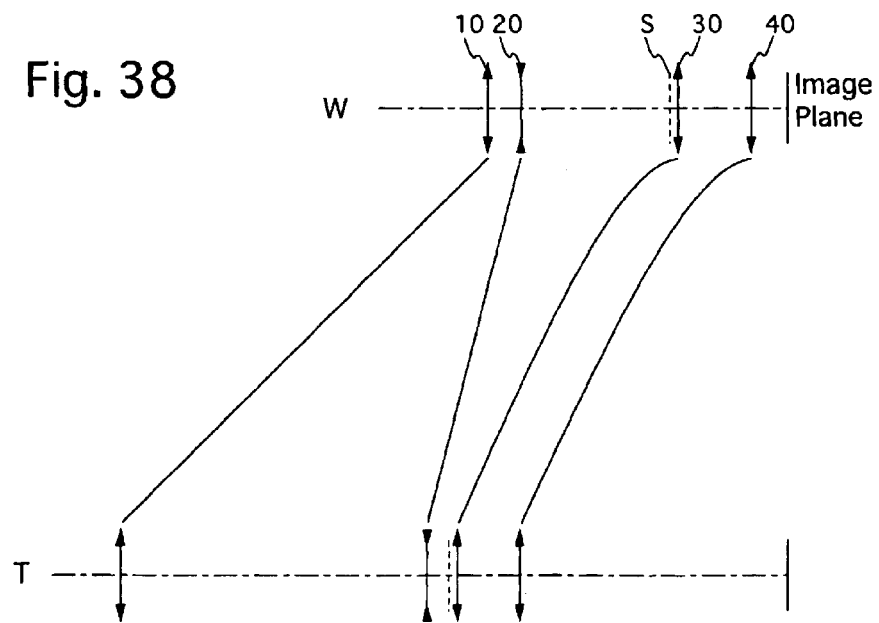
FIG. 38 is the schematic view of the lens-group moving paths for the zoom lens system according to the fourth embodiment of the present invention.

FIG. 19 is the lens arrangement, at the short focal length extremity, of the zoom lens system according to the fourth embodiment. FIGS. 20A through 20E show aberrations occurred in the lens arrangement shown in FIG. 19. FIG. 21 is the lens arrangement, at an intermediate focal length, of the zoom lens system. FIGS. 22A through 22E show aberrations occurred in the lens arrangement shown in FIG. 21. FIG. 23 is the lens arrangement, at the long focal length extremity, of the zoom lens system. FIGS. 24A through 24E show aberrations occurred in the lens arrangement shown in FIG. 23. FIG. 38 is the schematic view of the lens-group moving paths for the zoom lens system.

Table 4 shows the numerical data of the fourth embodiment. The basic arrangement of the fourth embodiment is the same as that of the first embodiment.

In the fourth embodiment, the positive first lens group 10 and the negative second lens group 20 are arranged to move upon zooming along the lens-group moving paths by a constant moving ratio so that condition (3) is satisfied; and the positive third lens group 30 and the positive fourth lens group 40 are arranged to move upon zooming along the lens-group moving paths by a constant moving ratio so that condition (4) is satisfied. Accordingly, the moving mechanism for each lens group can be constituted by a simple thread mechanism without using complicated cams, so that the overall cost of the mechanical arrangement of the lens frames can be reduced.

TABLE 4

FNO = 1:4.0–5.0–6.0
f = 29.01–50.00–86.85
W = 37.8°–23.2°–13.7°
fB = 38.00–51.46–64.02

| Surface No. | r | d | Nd | ν |
|---|---|---|---|---|
| 1 | 71.808 | 1.80 | 1.84666 | 23.8 |
| 2 | 45.451 | 0.59 | — | — |
| 3 | 49.827 | 6.51 | 1.77250 | 49.6 |
| 4 | 1298.844 | 2.81–14.66–33.88 | — | — |
| 5 | 58.773 | 1.50 | 1.60311 | 60.7 |
| 6 | 13.827 | 6.67 | — | — |
| 7 | −49.069 | 1.30 | 1.80400 | 46.6 |
| 8 | 29.327 | 0.37 | — | — |
| 9 | 23.437 | 3.01 | 1.80518 | 25.4 |
| 10 | 211.349 | 16.47–7.64–2.19 | — | — |
| 11 | 14.977 | 3.55 | 1.65100 | 56.2 |
| 12 | −267.840 | 1.59 | — | — |
| 13 | −16.323 | 1.50 | 1.80518 | 25.4 |
| 14 | −82.655 | 3.72–3.11–2.54 | — | — |
| 15 | −168.186 | 4.00 | 1.60717 | 40.3 |
| 16 | −15.887 | 0.62 | — | — |
| 17 | 43.236 | 4.92 | 1.48749 | 70.2 |
| 18 | −39.963 | 2.83 | — | — |
| 19 | −11.847 | 1.60 | 1.83400 | 37.2 |
| 20 | −24.372 | — | — | — |

Embodiment 5

Figure 25:
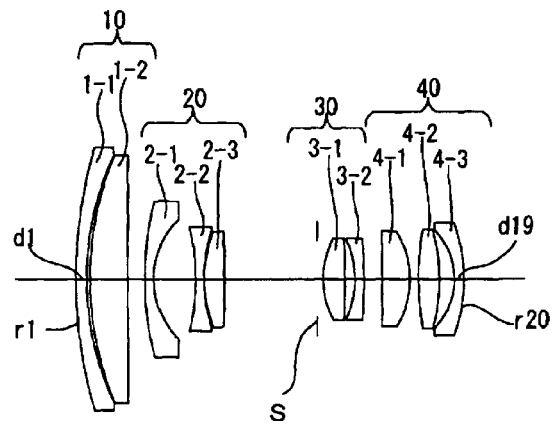
FIG. 25 is a lens arrangement, at the short focal length extremity, of the zoom lens system according to a fifth embodiment of the present invention.
Figures 26A, 26B, 26C, 26D, 26E:
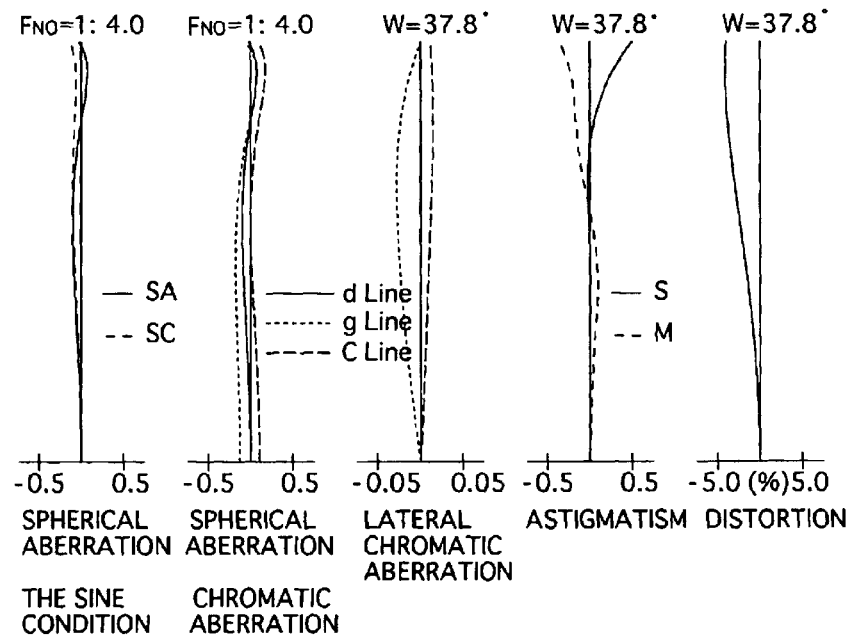
FIGS. 26A, 26B, 26C, 26D and 26E show aberrations occurred in the lens arrangement shown in FIG. 25.
Figure 27:
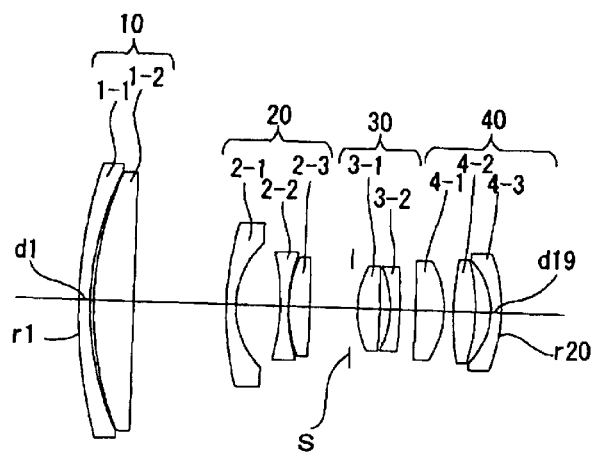
FIG. 27 is a lens arrangement, at an intermediate focal length, of the zoom lens system according to the fifth embodiment of the present invention.
Figures 28A, 28B, 28C, 28D, 28E:
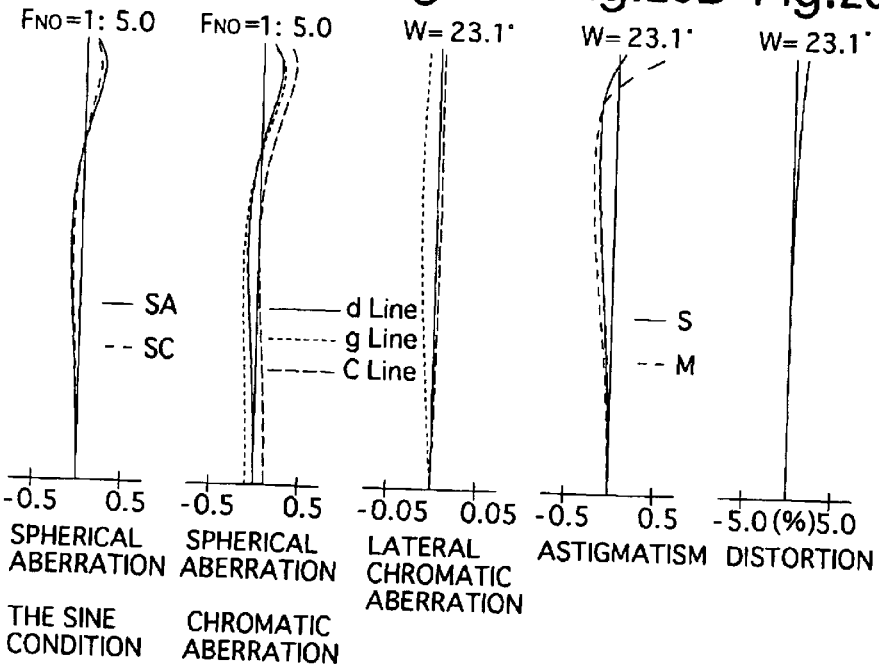
FIGS. 28A, 28B, 28C, 28D and 28E show aberrations occurred in the lens arrangement shown in FIG. 27.
Figure 39:
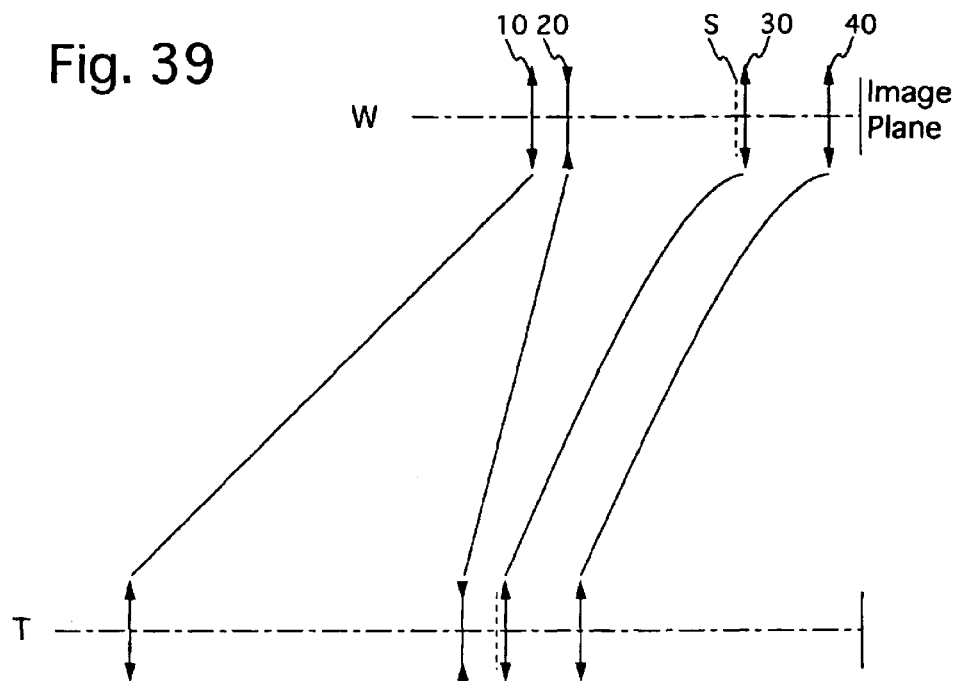
FIG. 39 is the schematic view of the lens-group moving paths for the zoom lens system according to the fifth embodiment of the present invention.

FIG. 25 is the lens arrangement, at the short focal length extremity, of the zoom lens system according to a fifth embodiment. FIGS. 26A through 26E show aberrations occurred in the lens arrangement shown in FIG. 25. FIG. 27 is the lens arrangement, at an intermediate focal length, of the zoom lens system. FIGS. 28A through 28E show aberrations occurred in the lens arrangement shown in FIG. 27. FIG. 29 is the lens arrangement, at the long focal length extremity, of the zoom lens system. FIGS. 30A through 30E show aberrations occurred in the lens arrangement shown in FIG. 29. FIG. 39 is the schematic view of the lens-group moving paths for the zoom lens system. Table 5 shows the numerical data of the fifth embodiment. The basic arrangement of the fifth embodiment is the same as that of the first embodiment.

In the fifth embodiment, the positive first lens group 10 and the negative second lens group 20 are arranged to move along the lens-group moving paths upon zooming by a predetermined constant moving ratio so that condition (3) is satisfied. Accordingly, the moving mechanism for these lens groups 10 and 20 can be constituted by a simple thread mechanism without using complicated cams, so that the overall cost of the mechanical arrangement of the lens frames can be reduced.

TABLE 5

FNO = 1:4.0–5.0–6.0
f = 29.02–50.00–86.85
W = 37.8°–23.1°–13.6°
fB = 38.00–51.56–64.40

| Surface No. | r | d | Nd | ν |
|---|---|---|---|---|
| 1 | 76.715 | 1.80 | 1.84666 | 23.8 |
| 2 | 48.416 | 0.56 | — | — |
| 3 | 53.139 | 6.30 | 1.77250 | 49.6 |
| 4 | 3415.651 | 2.81–14.72–34.49 | — | — |
| 5 | 50.294 | 1.50 | 1.60311 | 60.7 |
| 6 | 13.937 | 6.98 | — | — |

TABLE 5-continued

| | | | | |
|---|---|---|---|---|
| 7 | −36.841 | 1.30 | 1.80400 | 46.6 |
| 8 | 25.685 | 0.10 | — | — |
| 9 | 21.793 | 3.30 | 1.75520 | 27.5 |
| 10 | −213.530 | 16.24–7.44–2.01 | — | — |
| 11 | 14.659 | 3.60 | 1.65160 | 58.5 |
| 12 | −164.929 | 1.65 | — | — |
| 13 | −15.914 | 1.50 | 1.80518 | 25.4 |
| 14 | −95.389 | 3.09–2.50–2.00 | — | — |
| 15 | −274.914 | 4.50 | 1.60717 | 40.3 |
| 16 | −15.596 | 1.51 | — | — |
| 17 | 50.089 | 3.44 | 1.48749 | 70.2 |
| 18 | −30.085 | 2.46 | — | — |
| 19 | −11.818 | 1.60 | 1.83481 | 42.7 |
| 20 | −27.495 | — | — | — |

Embodiment 6

Figure 40:
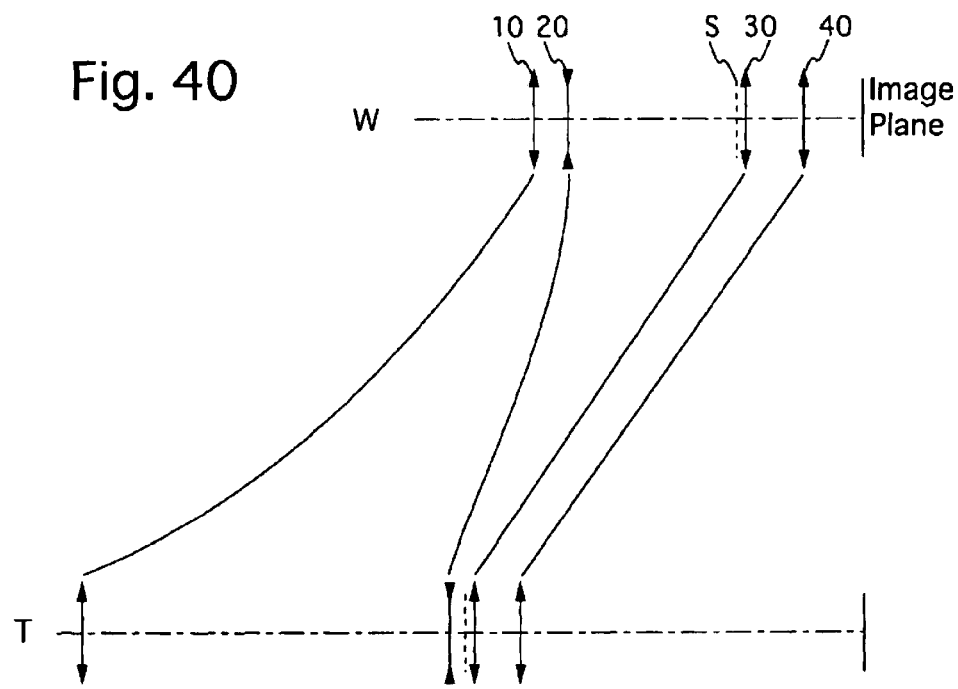
FIG. 40 is the schematic view of the lens-group moving paths for the zoom lens system according to the sixth embodiment of the present invention.

FIG. 31 is the lens arrangement, at an intermediate focal length, of the zoom lens system according to the sixth embodiment. FIGS. 32A through 32E show aberrations occurred in the lens arrangement shown in FIG. 31. FIG. 40 is the schematic view of the lens-group moving paths for the zoom lens system. The sixth embodiment utilizes the lens-group moving paths which are modified from those of the first embodiment. More specifically, note that at the short and long focal length extremities, the lens arrangement and the diagrams of aberrations are the same as those of the first embodiment. Accordingly, figures for the lens arrangement thereat, and the diagrams of aberrations thereat are omitted. FIG. 40 is the schematic view of the lens-group moving paths for the zoom lens system. Table 6 shows the numerical data of the sixth embodiment; however, the only difference between the numerical data between Table 1 and Table 6 is the data concerning the intermediate focal length.

In the sixth embodiment, the positive third lens group 30 and the positive fourth lens group 40 are arranged to move upon zooming along the lens-group moving paths by a constant moving ratio so that condition (4) is satisfied. Accordingly, the moving mechanism for these lens group 30 and 40 can be constituted by a simple thread mechanism without using complicated cams, so that the overall cost of the mechanical arrangement of the lens frames can be reduced.

TABLE 6

FNO = 1:4.0–5.0–6.0
f = 29.01–50.00–86.85
W = 37.8°–23.2°–13.7°
fB = 38.00–51.89–64.53

| Surface No. | r | d | Nd | ν |
|---|---|---|---|---|
| 1 | 72.441 | 1.80 | 1.84666 | 23.8 |
| 2 | 46.414 | 0.57 | — | — |
| 3 | 50.556 | 6.52 | 1.77250 | 49.6 |
| 4 | 1049.512 | 2.76–14.11–33.90 | — | — |
| 5 | 49.898 | 1.50 | 1.60311 | 60.7 |
| 6 | 13.606 | 6.65 | — | — |
| 7 | −41.850 | 1.30 | 1.80400 | 46.6 |
| 8 | 29.265 | 0.43 | — | — |
| 9 | 23.708 | 3.06 | 1.78472 | 25.7 |
| 10 | 508.786 | 16.14–7.41–2.14 | — | — |
| 11 | 15.054 | 3.63 | 1.65160 | 58.5 |
| 12 | −109.302 | 1.98 | — | — |
| 13 | −15.733 | 1.50 | 1.80518 | 25.4 |
| 14 | −102.508 | 3.05–2.46–1.93 | — | — |
| 15 | −193.197 | 4.50 | 1.60717 | 40.3 |
| 16 | −15.378 | 1.54 | — | — |

TABLE 6-continued

| 17 | 48.844  | 3.38 | 1.48749 | 70.2 |
| 18 | -32.787 | 2.55 | —       | —    |
| 19 | -11.961 | 1.60 | 1.83481 | 42.7 |
| 20 | -26.336 | —    | —       | —    |

Embodiment 7

Figure 33:
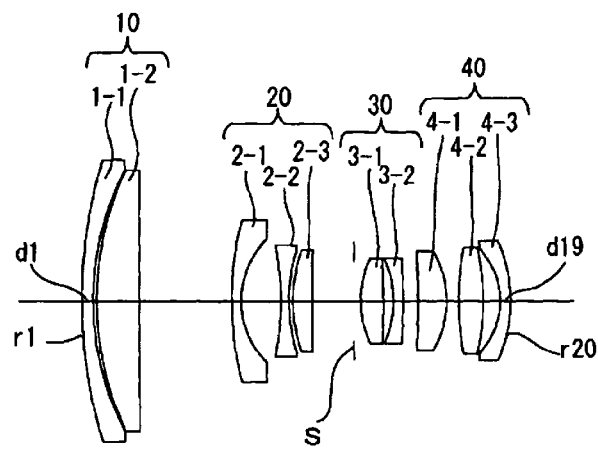
FIG. 33 is a lens arrangement, at an intermediate focal length, of the zoom lens system according to a seventh embodiment of the present invention.
Figures 34A, 34B, 34C, 34D, 34E:
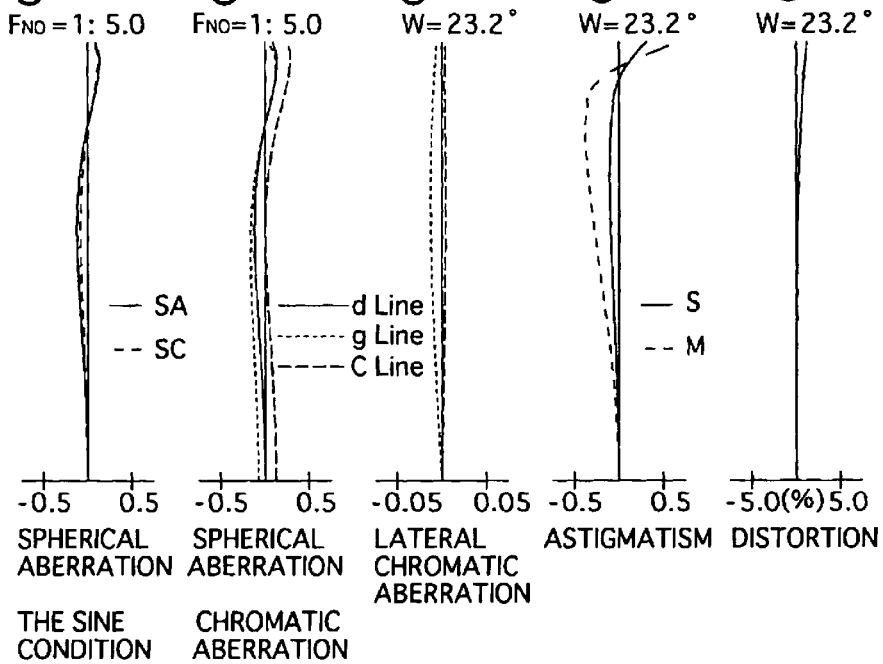
FIGS. 34A, 34B, 34C, 34D and 34E show aberrations occurred in the lens arrangement shown in FIG. 33.
Figure 41:
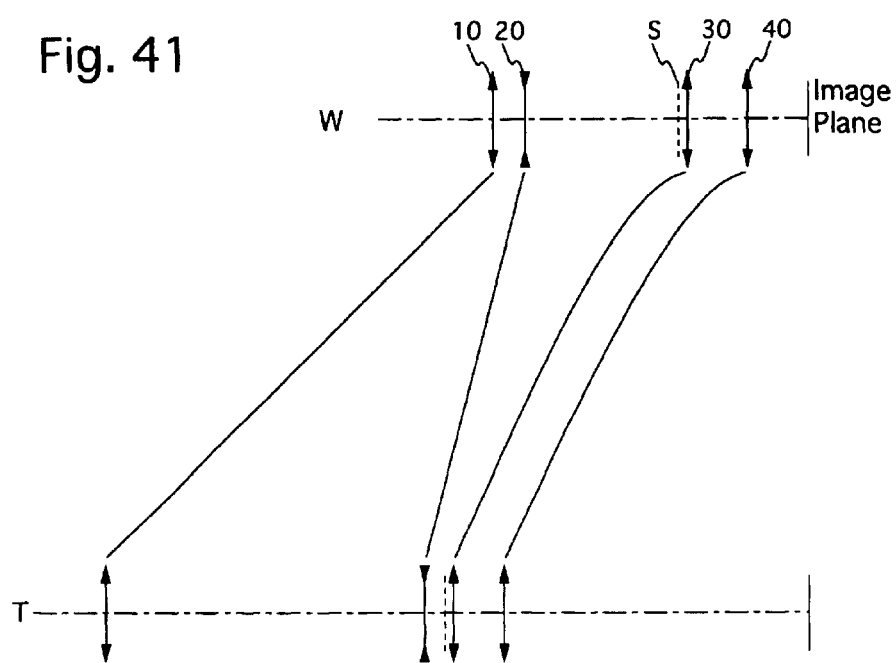
FIG. 41 is the schematic view of the lens-group moving paths for the zoom lens system according to the seventh embodiment of the present invention.

FIG. 33 is the lens arrangement, at an intermediate focal length, of the zoom lens system according to the seventh embodiment. FIGS. 34A through 34E show aberrations occurred in the lens arrangement shown in FIG. 33. FIG. 41 is the schematic view of the lens-group moving paths for the zoom lens system. The seventh embodiment utilizes the lens-group moving paths which are modified from those of the second embodiment. More specifically, note that at the short and long focal length extremities, the lens arrangement and the diagrams of aberrations are common to those of the second embodiment. Accordingly, figures for the lens arrangement thereat, and the diagrams of aberrations thereat are omitted. Table 7 shows the numerical data of the seventh embodiment; however, the only difference between the numerical data between Table 1 the second and Table 7 is the data concerning the intermediate focal length.

In the seventh embodiment, the positive first lens group 10 and the negative second lens group 20 are arranged to move upon zooming along the lens-group moving paths by a constant moving ratio so that condition (3) is satisfied. Accordingly, the moving mechanism for these lens groups 10 and 20 can be constituted by a simple thread mechanism without using complicated cams, so that the overall cost of the mechanical arrangement of the lens frames can be reduced.

TABLE 7

FNO = 1:4.0–5.0–6.0
f = 29.01–50.00–86.85
W = 37.8°–23.2°–13.7°
fB = 38.00–51.42–63.93

| Surface No. | r | d | Nd | ν |
|---|---|---|---|---|
| 1  | 77.087    | 1.80             | 1.84666 | 23.8 |
| 2  | 45.464    | 0.57             | —       | —    |
| 3  | 49.393    | 6.68             | 1.80400 | 46.6 |
| 4  | 1766.866  | 2.80–14.72–33.75 | —       | —    |
| 5  | 50.852    | 1.50             | 1.60311 | 60.7 |
| 6  | 13.832    | 6.29             | —       | —    |
| 7  | -42.755   | 1.30             | 1.80400 | 46.6 |
| 8  | 28.447    | 0.58             | —       | —    |
| 9  | 23.737    | 3.07             | 1.78472 | 25.7 |
| 10 | 434.312   | 16.37–7.61–2.14  | —       | —    |
| 11 | 15.164    | 3.59             | 1.65160 | 58.5 |
| 12 | -136.567  | 1.62             | —       | —    |
| 13 | -15.895   | 1.50             | 1.80518 | 25.4 |
| 14 | -90.593   | 3.00–2.41–1.89   | —       | —    |
| 15 | -156.795  | 4.50             | 1.60342 | 38.0 |
| 16 | -15.589   | 1.93             | —       | —    |
| 17 | 48.033    | 3.82             | 1.48749 | 70.2 |
| 18 | -37.169   | 2.79             | —       | —    |
| 19 | -11.857   | 1.60             | 1.83400 | 37.2 |
| 20 | -23.680   | —                | —       | —    |

Table 8 shows the numerical values of each condition for each embodiment.

TABLE 8

|          | Embod. 1 | Embod. 2 | Embod. 3 | Embod. 4 |
|---|---|---|---|---|
| Cond. (1) | 1.77250 | 1.80400 | 1.77250 | 1.77250 |
| Cond. (2) | 1.47    | 1.43    | 1.44    | 1.44    |
| Cond. (3) | —       | —       | —       | 3.94    |
| Cond. (4) | —       | —       | 0.95    | 0.96    |

|          | Embod. 5 | Embod. 6 | Embod. 7 |
|---|---|---|---|
| Cond. (1) | 1.77250 | 1.77250 | 1.80400 |
| Cond. (2) | 1.47    | 1.47    | 1.43    |
| Cond. (3) | 3.86    | —       | 3.92    |
| Cond. (4) | —       | 0.96    | —       |

As can be understood from Table 8, the numerical values of the first through seventh embodiments satisfy conditions (1) and (2), and as can be understood from the diagrams of aberrations, the aberrations at each focal length have been adequately corrected.

Furthermore, the fourth, fifth and seventh embodiments, in which the moving ratio of the positive first lens group 10 and the negative second lens group 20 is always constant, satisfies condition (3); and the third, fourth and sixth embodiments, in which the moving ratio of the positive third lens group 30 and the positive fourth lens group 40 is always constant, satisfies condition (4).

As can be understood from the above description, a zoom lens system of a four-lens-group arrangement, which (i) has a large zoom ratio of about 3, (ii) is miniaturized, and (iii) is produced at relatively low costs, can be achieved.

What is claimed is:

1. A zoom lens system comprising a positive first lens group, a negative second lens group, a positive third lens group and a positive fourth lens group, in this order from an object, wherein upon zooming, each of said first through fourth lens groups independently move along the optical axis;

wherein said positive first lens group comprises a negative first lens element and a positive second lens element, in this order from said object; and wherein said zoom lens system satisfies the following conditions:

$n_{1\text{-}2} > 1.68$ $1.35 < \Delta X1/f < 1.50$ wherein $n_{1\text{-}2}$ designates the refractive index of said positive lens element of said positive first lens group;

$\Delta X1$ designates the traveling distance of said positive first lens group from the short focal length extremity to the long focal length extremity; and f designates the focal length of the entire zoom lens system at the short focal length extremity.

2. The zoom lens system according to claim 1, wherein focusing from infinity to an object at a closer distance is performed by moving said negative second lens group toward said object.

3. The zoom lens system according to claim 1, wherein the ratio of the traveling distance of said positive first lens group to the traveling distance of said negative second lens group upon zooming is always constant; and wherein said zoom lens system satisfies the following condition:

$$3.50 < \Delta X1/\Delta X2 < 6.00$$

wherein

ΔX1 designates the traveling distance of said positive first lens group from the short focal length extremity to the long focal length extremity; and ΔX2 designates the traveling distance of said negative second lens group from the short focal length extremity to the long focal length extremity.

4. The zoom lens system according to claim 1, wherein the ratio of the traveling distance of said positive third lens group to the traveling distance of said positive fourth lens group upon zooming is always constant; and wherein said zoom lens system satisfies the following condition:

$$0.92 < \Delta X3/\Delta X4 < 0.98$$

wherein

ΔX3 designates the traveling distance of said positive third lens group from the short focal length extremity to the long focal length extremity; and ΔX4 designates the traveling distance of said positive fourth lens group from the short focal length extremity to the long focal length extremity.

5. The zoom lens system according to claim 1, wherein said negative second lens group comprises a negative meniscus lens element having the convex surface facing toward said object, a negative lens element and a positive lens element, in this order from said object;

wherein said positive third lens group comprises a positive lens element having a convex surface on the object-side thereof, and a negative lens element having a concave surface on the object-side thereof, in this order from said object; and wherein said positive fourth lens group comprises a positive lens element having a convex surface on the image-side thereof, a positive lens element and a negative meniscus lens element having the concave surface facing toward the object, in this order from said object.

* * * * *